Aug. 19, 1947.   C. B. LUBBERT ET AL   2,425,832
MOLD
Filed May 12, 1945

INVENTORS
C. B. LUBBERT
C. ROZANEK
BY
ATTORNEY

Patented Aug. 19, 1947

2,425,832

UNITED STATES PATENT OFFICE 2,425,832

MOLD

Carl B. Lubbert, Anneslie, and Charles Rozanek, Baltimore, Md., assignors to Western Electric Company, Incorporated, New York, N. Y., a corporation of New York Application May 12, 1945, Serial No. 593,504

4 Claims. (Cl. 18—36)

This invention relates to molds, and has for its object the provision of new and improved molds.

In molding a mass of material into a thin sleeve around a central core, it is sometimes necessary for the core to be centered very accurately in the mass of material. In the past, it has been very difficult to so center a core and hold it in its centered position while a mass of material is molded into a thin sleeve therearound by a mold of the press type.

A mold forming one embodiment of the invention includes a pair of relatively movable, complementary mold sections, and a gauge mounted in floating relationship with the mold sections.

A complete understanding of the invention may be obtained from the following detailed description of a mold constituting a specific embodiment thereof, when read in conjunction with the appended drawing, in which Fig. 1 is a top plan view of a mold section forming a part of a mold embodying the invention;

Figure 1:
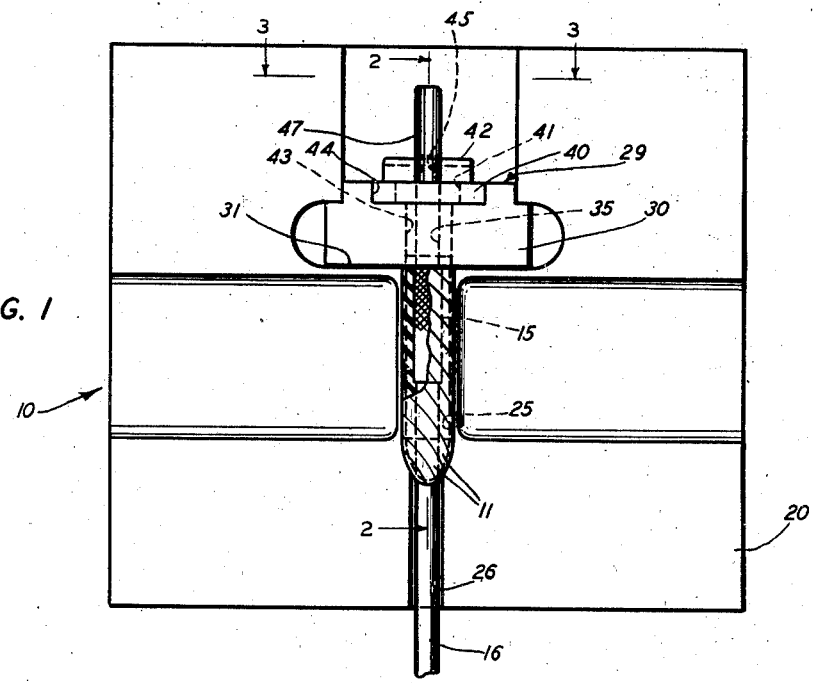
Figure 2:
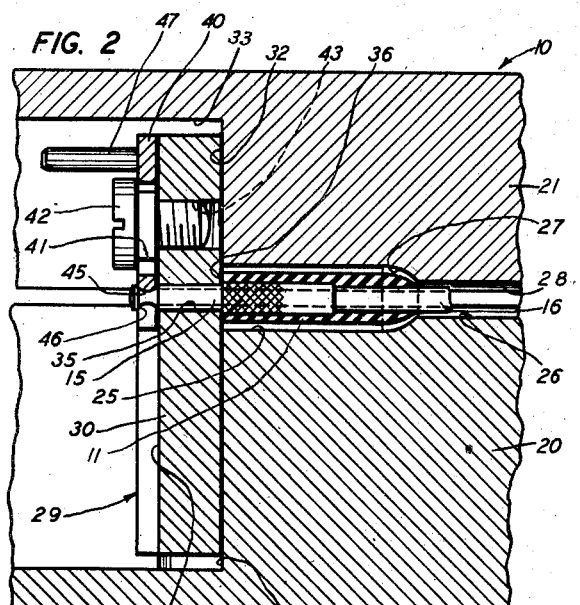
Fig. 2 is a fragmentary, vertical section of the mold taken along line 2—2 of Fig. 1.
Figure 3:
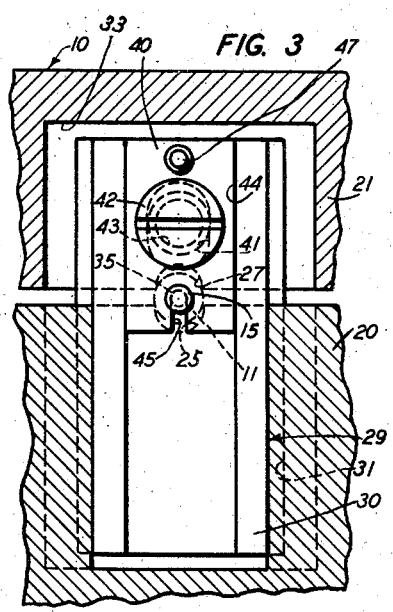
Fig. 3 is a fragmentary, vertical section of the mold taken along line 3—3 of Fig. 1.
Figure 4:
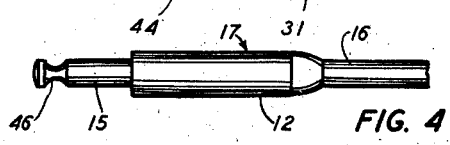
Fig. 4 is a fragmentary view of an article molded in the mold.

Referring now in detail to the drawing, there is shown therein a mold 10 for molding strips 11—11 (Fig. 1) made of a rubber compound, or a rubber-like material, into a thin sleeve 12 (Fig. 4) upon a portion of a terminal 15 secured to the end of an insulated conductor 16 to form a finished cord 17. The mold includes a stationary mold section 20 (Fig. 2) and a movable mold section 21, which may be moved toward the stationary mold section by conventional pressure-applying means (not shown), such as a hydraulic or air press.

The stationary mold section 20 has a molding recess 25 formed therein and also is provided with a groove 26, which extends from the molding recess 25. The movable mold section 21 is provided with a molding recess 27, which is complementary to the molding recess 25, and a groove 28, which is complementary to the groove 26. After the mold sections are moved together into molding relationship, the molding recesses 25 and 27 form a molding cavity and the grooves 26 and 28 form a passage extending from the molding cavity. The insulated conductor 16 fits snugly into the passage formed by the grooves.

A floating gauge 29 includes a gauge block 30, which fits closely in and is slidably mounted in a guideway 31 formed in the mold section 20 and bears against a surface 32 formed on the mold section 21, so as to close the molding recesses 25 and 27. The length of the gauge block is such that when the movable mold section is pressed against the stationary mold section, the block abuts a surface 33 formed on the mold section 21 and the bottom of the guideway 31, at which time a bore 35 extending transversely through the block is aligned axially with respect to the molding cavity formed by the molding recesses 25 and 27.

The bore 35 is substantially the same size as and is designed to receive the end of the terminal 15, which extends therethrough with a shoulder 36 thereof in abutment with the block 30. A locking plate 40 has a slot 41 formed therein, and a bolt 42 threaded into a tapped bore 43 formed in the gauge block 30 projects through the slot and mounts the plate slidably in a guideway 44 formed in the gauge block.

The locking plate 40 has a notch 45 formed in an end thereof, and the notch fits closely over an annular groove 46 formed in the end of the terminal 15 to secure the terminal to the gauge block 30 with the shoulder 36 of the terminal in abutment with the gauge block. A pin 47 may be used to slide the locking plate upon the gauge block to move the locking plate into or out of locking engagement with the terminal 15. The length of the locking plate is such that it abuts the movable mold section 21 when the movable mold section is pressed against the stationary mold section 20 so that the locking plate is held in locking engagement with the connector whenever the mold sections are in molding relationship.

In the operation of the mold 10, the movable mold section 21 is moved away from the stationary mold section 20, the floating gauge 29 is withdrawn from the guideway 31, and the end of the terminal 15 is inserted into the bore 35 of the gauge block 30 until the shoulder 36 of the terminal abuts the gauge block. The locking plate then is moved downwardly to slide the notch 45 over the annular groove 46 formed in the terminal, whereby the terminal is locked against movement relative to the floating gauge.

The floating gauge 29 then is inserted into the guideway 31, the insulated conductor 16 is placed in the groove 26 formed in the stationary mold section 20, and the strips 11—11 wrapped around the insulated conductor 26 and a portion of the terminal 15 rest in the molding recess 25 of the stationary mold section. The strips provide a certain amount of molding material in excess of that required to form the sleeve 12 (Fig. 4) so that the axis of the terminal (Fig. 2) is raised above the axis of the molding recess 25, whereby the gauge block 30 is raised out of contact with the bottom of the guideway 31 formed in the stationary mold section.

The movable mold section 21 then is moved towards and is pressed against the stationary mold section 20, and the floating gauge 29 is moved thereby to a position in which the gauge block 30 thereof abuts the bottom of the guideway 31 and the surface 33 formed on mold section 21, whereby the terminal 15 is moved to a position in which it is concentric with the molding recesses 25 and 27. The mold sections 20 and 21 are heated by suitable means, such as heated platens, (not shown) and the strips 11—11 are held under pressure by the mold sections until the strips are molded into the sleeve 12 (Fig. 4) and are set in that condition.

The movable mold section 21 (Fig. 2) then is moved away from the stationary mold section 20 and the floating gauge 29, and the floating gauge is withdrawn from the mold section 20. The locking plate 40 then is slid upwardly in the guideway 44 to release the terminal 15, which then is removed from the floating gauge, and the operation described hereinabove is repeated.

If it is so desired, a second floating gauge (not shown) identical with the floating gauge 29 may be provided so that one of the floating gauges may be loaded with a terminal while the other floating gauge is used in a molding operation of the mold 10. The newly loaded floating gauge then may be substituted for that in the mold 10 after it is removed from the mold sections 20 and 21 so that the next molding operation may be started before the removed floating gauge is unloaded.

The floating gauge 29 serves to orient the terminal 15, the insulated conductor 16 and the strips 11—11 in the molding cavity formed by the molding recesses 25 and 27, and prevents lateral, longitudinal or angular movement of the terminal while the mold sections 20 and 21 are in molding relationship, as well as centering the terminal therein during the molding operation. Hence, sleeves similar to the sleeve 12 (Fig. 4) formed by the mold 10 are molded uniformly and perfectly.

A plurality of molding recesses similar to the molding recesses 25 and 27 may be formed in the mold 10, and a plurality of guideways and floating gauges may be associated therewith, whereby a plurality of thin sleeves similar to the thin sleeve 12 may be formed by one operation of the mold.

What is claimed is:

1. In a molding apparatus, a pair of relatively movable, complementary mold sections, a gauge block mounted in floating relationship with the mold sections, and a locking plate slidably mounted on the gauge block for engaging a core to hold it in a predetermined position relative to the gauge block and prevent longitudinal movement of the core.

2. In a molding apparatus, a stationary mold section having a molding recess formed therein, a movable mold section having formed therein a molding recess complementary to the first-mentioned molding recess, said movable mold section being movable into and out of molding relationship with respect to the stationary mold section for molding in the molding recesses a mass of material around a core, a gauge block slidably mounted on one of the mold sections and having a hole formed therein for receiving the core, said gauge block being slidable to a predetermined position with respect to the mold sections when the movable mold section is moved into molding relationship with respect to the stationary mold section, whereby the hole in the gauge block is oriented with respect to the molding recesses, and means carried by the gauge block for latching the core in the hole in the gauge block.

3. In a molding apparatus, a pair of relatively movable mold sections having complementary molding recesses formed therein for forming a molding cavity when they are moved into molding relationship, one of said mold sections being provided with a guideway positioned at an end of the molding recess, said guideway terminating in an end face, a gauge block slidable in the guideway and having a bore therethrough for receiving a terminal, said gauge block serving to abut the end face of the guideway and a surface on the complementary mold section when the mold sections are in molding relationship and being held thereby in a position in which the terminal is oriented with respect to the molding recesses, and a locking plate slidably mounted on the gauge block and having a notch formed therein for engaging the end of the terminal to hold it against movement with respect to the gauge block.

4. In a molding apparatus, a stationary mold section having an elongated molding recess formed therein and also being provided with a guideway extending transversely to and intersecting the end of the recess, a movable mold section having formed therein an elongated molding recess complementary to the first-mentioned molding recess, a gauge block fitting slidably into the guideway and having a bore therein in which an end portion of a terminal fits, said gauge block being slidable out of the guideway when the mold sections are out of molding relationship, and a locking plate slidably mounted on the gauge block and having a notch formed therein for engaging a groove in the end portion of the terminal to hold the terminal against movement relative to the bore, said gauge block being engaged by an end of the guideway with the bore in alignment with the molding recesses in the mold sections when the movable mold section is in a molding relationship with respect to the stationary mold section, whereby the terminal is held in alignment with the molding recesses.

CARL B. LUBBERT.
CHARLES ROZANEK.

REFERENCES CITED

The following references are of record in the file of this patent:

UNITED STATES PATENTS

| Number | Name | Date |
|---|---|---|
| 1,534,780 | Hansen | Apr. 21, 1925 |

FOREIGN PATENTS

| Number | Country | Date |
|---|---|---|
| 406,849 | Great Britain | Mar. 8, 1934 |